(12) United States Patent
Martino Gonzalez et al.

(10) Patent No.: US 10,124,876 B2
(45) Date of Patent: Nov. 13, 2018

(54) AIRCRAFT FUSELAGE FRAME

(71) Applicants: Airbus Operations S.L., Madrid (ES); Airbus Operations SAS, Toulouse (FR)

(72) Inventors: Esteban Martino Gonzalez, Madrid (ES); Diego Folch Cortes, Madrid (ES); Pablo Goya Abaurrea, Madrid (ES); Angel Pascual Fuertes, Madrid (ES); Sandra Linares Mendoza, Madrid (ES); Julien Guillemaut, Toulouse (FR); Eric Bouchet, Toulouse (FR); Jerome Colmagro, Toulouse (FR); Jonathan Blanc, Toulouse (FR)

(73) Assignees: Airbus Operations S.L., Madrid (ES); Airbus Operations (SAS), Toulouse (FR)

( * ) Notice: Subject to any disclaimer, the term of this patent is extended or adjusted under 35 U.S.C. 154(b) by 220 days.

(21) Appl. No.: 14/952,376

(22) Filed: Nov. 25, 2015

(65) Prior Publication Data
US 2016/0152315 A1 Jun. 2, 2016

(30) Foreign Application Priority Data
Nov. 27, 2014 (EP) ..................................... 14382475

(51) Int. Cl.
*B64C 1/06* (2006.01)
*B64C 1/12* (2006.01)
*B64C 1/16* (2006.01)
*B64C 1/26* (2006.01)
*B64C 3/32* (2006.01)

(52) U.S. Cl.
CPC ................ *B64C 1/061* (2013.01); *B64C 1/06* (2013.01); *B64C 1/12* (2013.01); *B64C 1/16* (2013.01); *B64C 1/26* (2013.01); *B64C 3/32* (2013.01)

(58) Field of Classification Search
CPC .. B64C 1/06; B64C 1/061; B64C 1/16; B64C 1/26; B64C 3/32; B64D 27/06; B64D 27/08; B64D 27/12; B64D 27/14; B64D 27/18; B64D 27/20
See application file for complete search history.

(56) References Cited

U.S. PATENT DOCUMENTS

| 1,392,278 | A | | 9/1921 | Kirkham et al. |
| 1,981,237 | A | * | 11/1934 | Loughead ................. B64C 1/16 244/55 |
| 2,500,015 | A | | 3/1950 | Tweney et al. |
| 4,198,018 | A | | 4/1980 | Brault |

(Continued)

FOREIGN PATENT DOCUMENTS

GB 2 268 461 1/1994

OTHER PUBLICATIONS

European Search Report cited in EP 14 38 2475 completed May 8, 2015, six pages.

*Primary Examiner* — Richard R Green
(74) *Attorney, Agent, or Firm* — Nixon & Vanderhye P.C.

(57) ABSTRACT

An aircraft fuselage frame including a central element adapted to be located within the perimeter of the fuselage, and two lateral extensions projecting outside the perimeter of the fuselage from both sides of the central element that are a portion of a longitudinal structure of a lifting surface. The central element and the two lateral extensions are configured as an integrated piece.

19 Claims, 3 Drawing Sheets

(56) References Cited

U.S. PATENT DOCUMENTS

| | | | | |
|---|---|---|---|---|
| 4,821,980 A | * | 4/1989 | Clausen | B64D 27/14 244/54 |
| 8,322,656 B2 | * | 12/2012 | Pahl | B64C 1/08 244/119 |
| 8,480,025 B2 | * | 7/2013 | Lafont | B64D 27/14 244/54 |
| 8,540,186 B2 | * | 9/2013 | Marche | B64D 27/14 244/54 |
| 9,533,768 B2 | * | 1/2017 | Barmichev | B64C 3/32 |
| 2010/0187352 A1 | | 7/2010 | Yavilevich | |
| 2013/0062467 A1 | | 3/2013 | Soenafjo | |
| 2014/0175218 A1 | | 6/2014 | Gallant et al. | |

* cited by examiner

AIRCRAFT FUSELAGE FRAME

RELATED APPLICATION

This application claims priority to European Patent application No. 14382475.3 filed Nov. 27, 2014, the entirety of which application is incorporated by reference.

FIELD OF THE INVENTION

The present invention refers to a frame of a fuselage of an aircraft and to a section of a fuselage including the frame. The frame is related both to the fuselage structure and to the lifting surfaces located at both sides of the fuselage. The term "lifting surface" includes wings of the aircraft, and associated stabilizing and/or supporting surfaces, such as horizontal stabilisers or pylons for supporting the engines of the aircraft.

BACKGROUND OF THE INVENTION

Known aircraft structures comprise a fuselage and lifting surfaces located at both sides of the fuselage such as wings or pylons for supporting the engines of the aircraft or other supporting structures.

Known fuselages comprise a plurality of frames, stringers and beams, which act as reinforcing members of the aircraft skin. In order to integrate lifting surfaces with fuselage structures, an opening is usually performed in the fuselage skin, often implying an interruption in the structure of some of the frames of said fuselage.

Lifting surfaces may be divided into two or three independent parts, a central box located inside the fuselage and two lateral boxes located at both sides of the fuselage or, as an alternative, the lifting surfaces can be divided into two lateral boxes joined at the symmetry axis of the aircraft. Structural boxes comprise at least a front spar and a rear spar extending in the longitudinal direction of the torsion box, upper and lower skins and ribs extending in the transversal direction of the structural box.

Wings are usually located at upper or lower positions with respect to a fuselage section while pylons are usually located at a central position of a fuselage section.

Regarding pylons, a first known configuration may include a pylon extending between both engines and located at a centered position of the height of the cylindrical part of the fuselage. The central part of the pylon is introduced into the fuselage, therefore said configuration implies a discontinuity or, at least, a cut-out in the fuselage skin, with the associated impact in the loads distribution. In some cases, it even entails the discontinuity of some other structural elements such as stringers, longitudinal beams or frames.

The interface between lateral boxes of the lifting surfaces and the fuselage is usually solved by tension bolts and/or shear rivets. The junction joins the two lateral boxes to the rear part of the fuselage and a significant number of tension bolts need to be installed. Furthermore, the fuselage cylindrical skin needs to be adapted to the flat surface of the junction making the manufacturing and assembly process very complex.

SUMMARY OF THE INVENTION

A novel aircraft fuselage frame has been conceived and is disclosed here which comprises: a central element adapted to be located within the perimeter of the fuselage, and two lateral extensions projecting outside the perimeter of the fuselage from both sides of the central element, that are a portion of a longitudinal structure of a lifting surface. Furthermore the central element and the two lateral extensions are configured as an integrated piece.

The invention may be used to provide a more integrated structure having light weight and also ensuring the load continuity between the fuselage and the lifting surfaces. It has to be understood for this application that a structure is called integrated when all its structural components are manufactured together.

A first advantage is that the total weight of the aircraft is reduced as the junction areas disappear which also simplifies the assembly and removal of said joining additional parts. Moreover load transfer is improved due to said continuos integrated structure.

From an additional point of view, the claimed frame integrates the traditional transversal reinforcing function of a frame with the traditional longitudinal reinforcing function of, for instance, the central box of a lifting surface and both functions are performed by said frame. Said integration leads to a simplified structure and also to a weight reduction of the aircraft.

Moreover an upper or lower location of the lateral extensions with respect to the central element allows an increase in the available space inside the fuselage for systems, having a positive impact in assembly, operability and maintenance in comparison with the state of the art solutions in which the central part of the pylon is located in an intermediate position.

A novel fuselage section has been conceived and is disclosed herein that includes: at least two frames according to the preceding technical features, and a skin portion continuously extending over said two frames.

DESCRIPTION OF THE FIGURES

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE INVENTION

Figure 1:
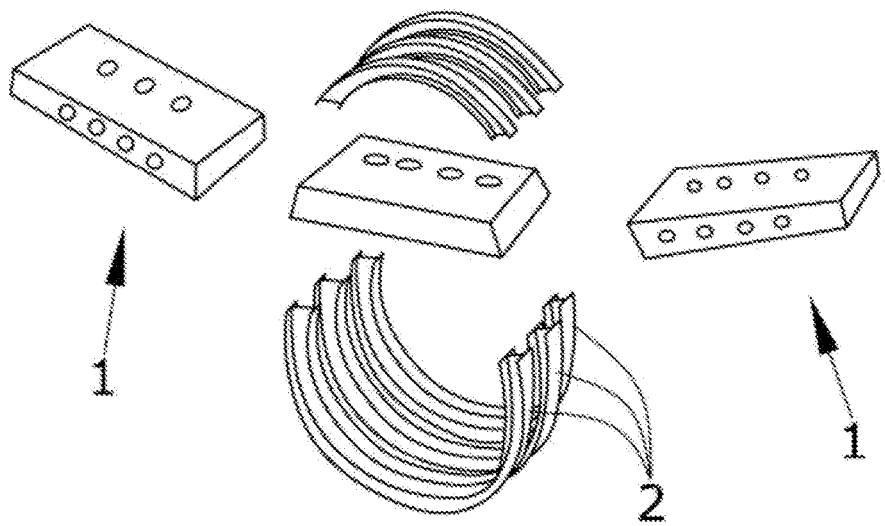
FIG. 1 shows a known configuration of a fuselage section having three frames and a pylon, the pylon comprising a central box and two lateral boxes.

FIG. 1 discloses a known structure in which the lifting surface refers to a pylon. The shown structure comprises a plurality of frames (2) and a lifting surface (1), that is to say, a pylon that is divided into a central box and two lateral boxes.

It should be appreciated that the concepts described herein relating to an aircraft pylon may also be used for other aircraft lifting surfaces, such as wings, horizontal stabilizers or other structures. Therefore, although the following explanation is also extensive to other lifting surfaces (1) having structural boxes going through the fuselage, the following embodiments will refer to pylons for supporting the engines (7) of an aircraft.

In the embodiments shown in FIGS. 2 to 5a and 5b, the lateral extensions (4) are or a portion of a longitudinal structure or the whole longitudinal structure of a lifting surface (1) as previously stated.

In the case of pylons, the claimed frame (2) offers the possibility of further joining an extension arm (6) to the outer edge of the lateral extensions (4) and hence the lateral extensions (4) comprise means for connecting said extension arms (6). The extension arms (6) are connected to the engines (7). The extension arms (6) and also the two lateral extensions (4) may have different lengths depending on the kind of engines (7) to be used, thus increasing the flexibility of the claimed structure.

Two different embodiments will be described in detail. In these embodiments the aircraft structure could comprise at least two frames (2) as described above wherein the central element (3) and the lateral extensions (4) are located in the same fuselage cross-section. In case of having two frames (2), one of the frames (2) would be located at a front location and the other at a rear location so that the lateral extensions (4) would be located in a position equivalent to those of a front and rear spar of a torsion box of a supporting structure in the state of the art.

More specifically the shown embodiment comprises three consecutive frames (2). The lateral extensions (4) of the frame (2) are a portion of the longitudinal structure of a torsion box of a support structure for attaching the engines (7) of an aircraft.

Figure 3:
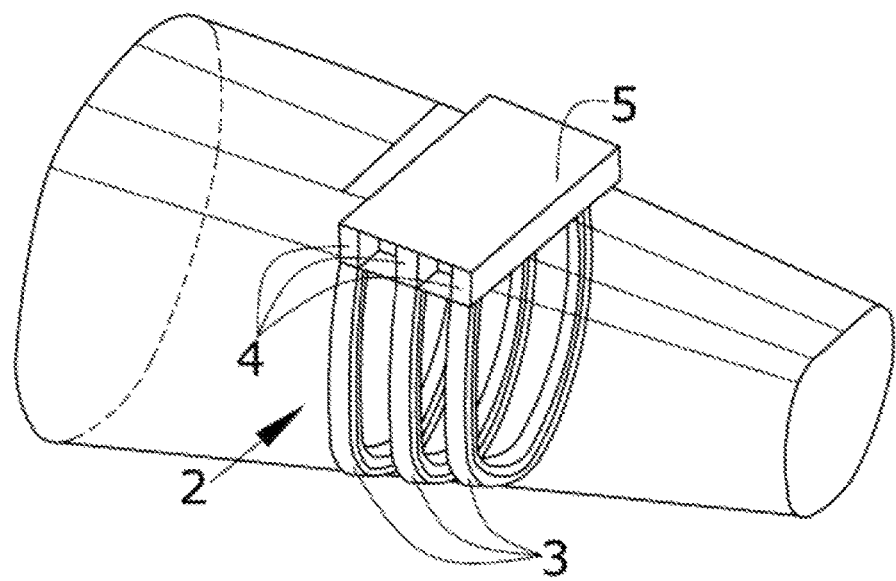
FIG. 3 shows a perspective view of a section of a fuselage comprising three frames of the embodiment of the invention shown in FIG. 2.

More specifically, as shown in FIG. 3, a first frame (2) of the fuselage is located at a front location so that its lateral extensions (4) are located in a position equivalent to that of the front spar of a torsion box of a supporting structure. A second frame (2) of the fuselage consecutive to the first frame (2) is located so that its lateral extensions (4) are located in a position equivalent to that of a spar of a torsion box of a supporting structure. A third frame (2) of the fuselage consecutive to the second frame (2) is located at a rear location so that its lateral extensions (4) are located in a in a position equivalent to that of a rear spar of a torsion box of a supporting structure. A skin (5) portion continuously extends over the three frames (2) and hence over the corresponding two lateral extensions (4).

Figure 2:
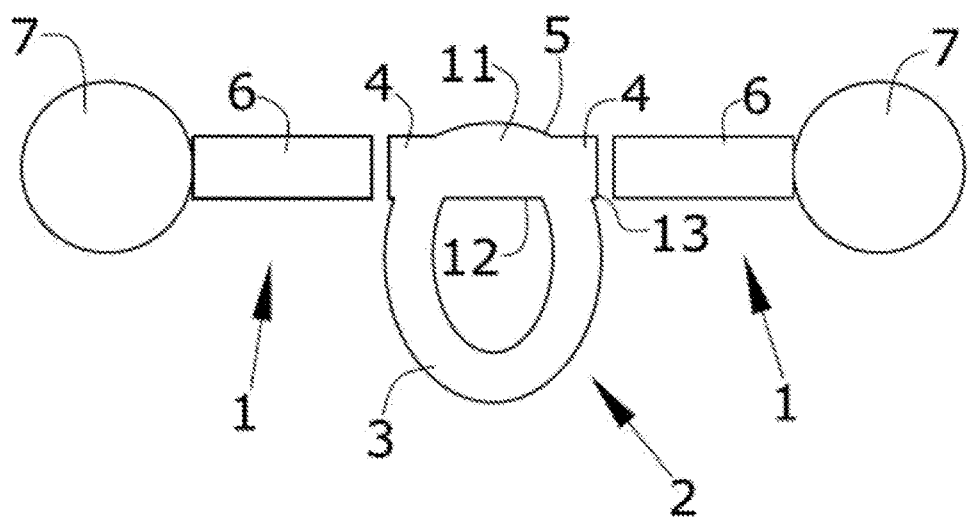
FIG. 2 shows a schematic view of a cross section of a first embodiment of the frame of the invention wherein the lateral extensions are a portion of an engine supporting structure.

In the first embodiment shown in FIGS. 2 and 3, the lateral extensions (4) are further connected to the two extension arms (6). The skin (5) extends over the three frames (2), their corresponding lateral extensions (4) and the extension arms (6). The skin (5) could also extend along the longitudinal direction of the fuselage providing a cruciform shape that should be manufactured in a single panel. Full multi-function of the skin (5) transmitting loads from the fuselage and from the engine support structure allows obtaining a more lightweight structure.

The extension arms (6) are separated elements therefore there is a joining mean between said extension arm (6) and the lateral extension (4). Said joining means can be tension bolts and/or shear rivets. Although this embodiment also needs a joining means between the lateral extensions (4) and the extension arms (6) it should be noted that the junction between the portion of the lateral extensions (4) and the extensions arms (6) is made at a surface independent from the interface area between the fuselage and the lifting surface.

Figure 4:
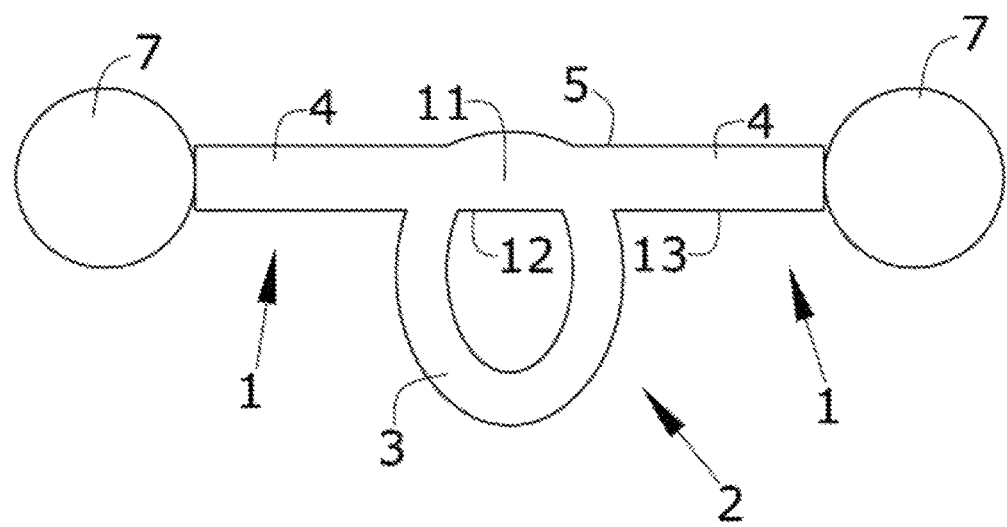
FIG. 4 shows schematic view of a cross section of a second embodiment of the frame of the invention wherein the lateral extensions are an engine supporting structure.
Figure 5A:
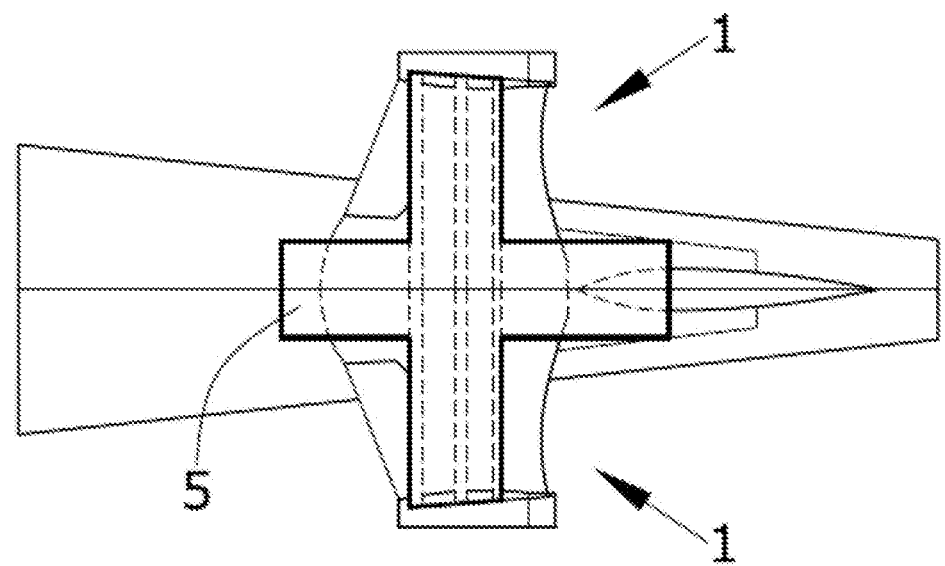
FIGS. 5*a* and 5*b* show a plan view (FIG. 5*a*) and a perspective view (FIG. 5*b*) of a section of a fuselage comprising three frames of the embodiment of the invention shown in FIG. 4.
Figure 5B:
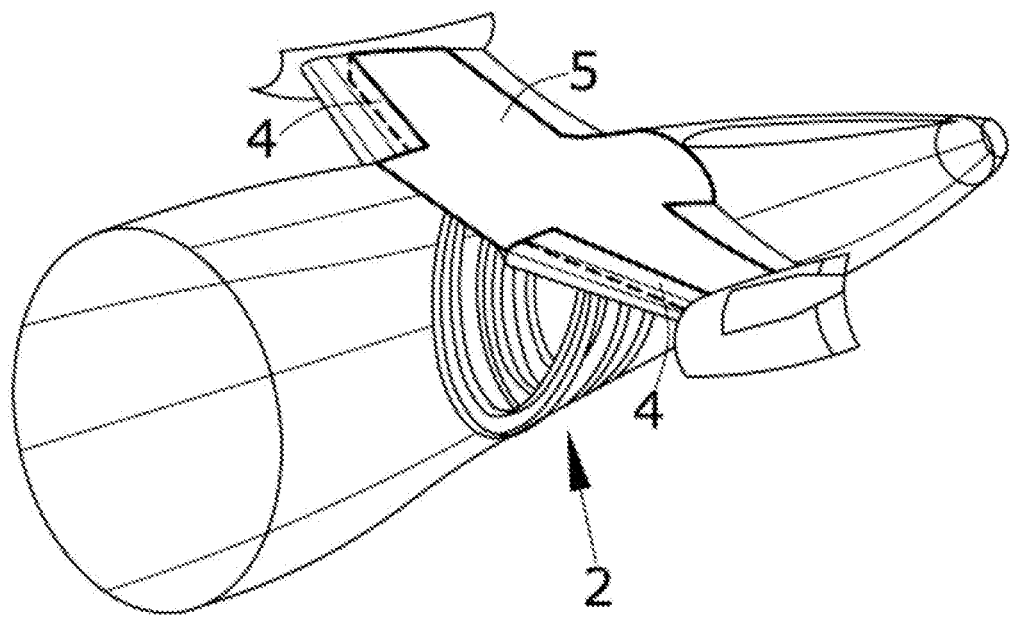

FIGS. 4 and 5a and 5b show a second embodiment of the invention wherein the lateral extensions (4) extend until they reach the engines (7). In this embodiment the skin (5) portion of the fuselage is also extended in the lateral directions of the aircraft structure providing a cruciform shape that should be manufactured in a single panel as it also extends in the longitudinal direction of the aircraft. The previously described configuration of the skin (5) would also be applicable to said embodiment.

In this embodiment the full longitudinal structure of the lifting surface (1) is part of the frame (2), without any disassembly junction between the longitudinal structure (1) and the fuselage, so that the penalty weight due to these junctions is removed.

This second embodiment could also be applied to a wing, HTP, VTP in which the whole extension arm (4) would be equivalent to a spar of a lateral torsion box that is integrated into the claimed frame (2).

The additional advantage of this second embodiment is that it allows fully eliminating the current junction reducing critical load path concentration that could lead to a subsequent reduction engine support structure width and height, reducing additionally the weight penalty as a consequence.

Therefore the aforementioned junction could be avoided in the embodiment in which the lateral extensions (4) reach the engines (7) thus reducing both the cost of the skin (5) elements and the required hours/work for assembling the portion of the lateral extension (4), or at least, in the embodiment in which two extension arms (6) are provided, the junction could be isolated from the fuselage curvature simplifying it.

Additionally, the lower edge (12) of the upper portion (11) of the central element (3) is aligned with the lower edge (13) of the lateral extensions (4). The advantage of this configuration is that the upper portion (11) of the central element (3) of the frame (2) is wider than the rest of the frame (2) providing a more robust frame (2) that also benefits load transmission and weight savings due to loads carried by the lower edge (13) of the lateral extensions (4) are transmitted directly to the lower edge (12) of the upper portion (11). In addition, the upper portion (11) could be provided with a panel covering the lower edge (12) but also being the lower edge (12) of said upper portion (11) aligned with the lower edge (13) of the lateral extensions (4). Moreover the upper portion (11) of the central element (3) integrates the traditional transversal reinforcing function of the upper part of a frame with the traditional longitudinal reinforcing function of a spar of the central box of a lifting surface and both functions are performed by said frame.

Although the embodiments show lateral extensions (4) that are located at an upper position with respect to a section of the fuselage, a lateral extension (4) located at a lower position is also possible.

One of the main advantages of the invention is that it allows manufacturing the frame (2) including its lateral extensions (4) and the skin (5) with one shot panels. Spars and frames could also be manufactured as a single part and as a result of this integration the number of elements to be assembled is reduced.

Both configurations have the advantage that, comparing with the known architecture, the aircraft structure length is reduced allowing associated penalty weight reduction. This is because known architectures are usually divided into three independent parts, a central box located inside the fuselage at a centered position and two lateral boxes located at both sides of the fuselage joined at their root to the central box and afterwards rising to an upper position with respect to the fuselage section therefore the pylon is not straight. In contrast, in the claimed invention the two lateral extensions are located at an upper or a lower position of the frame and hence the pylon can be straight and therefore the total length of the structure is decreased.

Another advantage is that as the pylon is straight and therefore the diedric angle is reduced, as previously explained, the engine installation is easier as the installation is carried out by elevating the engine from a lower position to an upper vertical position, whereas in the known configuration the engine is installed from a lower position to an upper and diagonal position, implying a roll movement of the engine.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

We claim:

1. An aircraft fuselage frame comprising:
   a central frame element configured to be located within a perimeter of a fuselage, wherein the central frame element has an outer surface adjacent an outer skin of the fuselage and an inner surface extending entirely around an inner perimeter of the central frame element, and a continuous web connecting the outer surface to the inner surface and extending the entire circumferences of the outer and inner surfaces;
   a continuous area within the fuselage and uninterrupted by the aircraft fuselage frame, wherein the perimeter of the continuous area is defined by an entirety of the inner surface of the central frame, and
   lateral extensions projecting from opposite sides of the fuselage, wherein each of the lateral extensions is a portion of a respective longitudinal structure of a lifting surface extending from the fuselage,
   wherein upper surfaces of each of the lateral extensions are aligned with an upper region of the central frame element such that a line projected from either of the upper surfaces into the central frame element passes through the continuous web and does not intersect the inner surface of the central frame element; and
   wherein the central element and the lateral extensions are an integrated, single-piece component.

2. The aircraft fuselage frame according to claim 1, wherein the lateral extensions each include a lower edge which is aligned with and parallel to a straight portion of the inner surface of the upper position of the central frame element.

3. The aircraft fuselage frame according to claim 1 wherein the lateral extensions each include a connection to an extension arm.

4. The aircraft fuselage frame according to claim 1, wherein the central frame element and the lateral extensions are in a common cross section of the fuselage, wherein the cross section is in a plane perpendicular to an axis of the fuselage.

5. The aircraft fuselage frame according to claim 1, wherein a lower edge of the upper region of the central frame element is aligned along a line with a lower edge of each of the lateral extensions.

6. A fuselage comprising:
   fuselage frames each including a central frame element within a perimeter of the fuselage, wherein the central frame element in each of the fuselage frames is a beam including an outer surface adjacent an outer skin of the fuselage and an inner surface extending entirely around an inner perimeter of the central element;
   each of the central frame elements defines a respective continuous area uninterrupted by the respective fuselage frame, wherein the perimeter of the continuous area is defined by the inner surface of the beam of the central frame, and
   each of the fuselage frames includes lateral extensions projecting outward from the fuselage and from the central frame element for the fuselage frame, wherein the lateral extensions are each a portion of a longitudinal structure of a respective lifting structure projecting from the fuselage;
   wherein each of the fuselage frames, including the central frame element and the lateral extensions, are an integrated, single-piece component;
   wherein in each of the fuselage frames, a line projected entirely through the lateral extensions extends through an upper region of the central frame element and does not intersect the inner surface of the central frame element; and
   wherein the outer skin of the fuselage extends continuously over the outer surfaces of the fuselage frames.

7. The fuselage according to claim 6, wherein the lateral extensions of each of the fuselage frames are a portion of a longitudinal structure of a torsion box for each of the respective lifting structures, wherein each of the lifting structures is configured to support at least one aircraft engine.

8. The fuselage according to claim 7, wherein the lateral extensions for each of the fuselage frames extend to the at least one aircraft engine.

9. The fuselage according to claim 7, wherein the lateral extensions for each of the fuselage frames include connections to an extension arm extending to the at least one aircraft engine.

10. The fuselage according to claim 9, further comprising pylon skins each covering the lateral extensions and the extension arms on a respective side of the fuselage.

11. An aircraft comprising the fuselage of claim 6.

12. The aircraft according to claim 11, wherein the outer skin of the fuselage extends in a longitudinal direction of the fuselage.

13. An aircraft comprising:
   a fuselage including a sequence of frames arranged along a longitudinal axis of the fuselage and each of the frames is in a respective plane substantially perpendicular to the longitudinal axis;
   each of the frames is an integral, single piece component which includes a central frame element and lateral extensions extending outward from opposite sides of the fuselage, wherein (i) the central frame element includes an outer surface adjacent a skin of the fuselage, an inner surface, and a web extending between the outer and inner surfaces, (ii) the inner surface defines a perimeter of an area within the central element and the area is uninterrupted by the frame, (iii) the web is continuous along the entirety of the outer and inner surfaces, and (iv) a line projected through an entirety of either of the lateral extensions extends through the web of the central frame element and does not intersect the inner surface of the central frame element; and aerodynamic lifting structures extending from opposite sides of the fuselage, wherein the lifting structures are arranged symmetrically with respect to the longitudinal axis, wherein the aerodynamic lifting structures each include at least one of the lateral extensions extending from each of the frames, and a skin covering the lateral extensions included in the aerodynamic lifting structure.

14. The aircraft as in claim 13 wherein the frames are arranged sequentially along the longitudinal axis and aligned with the aerodynamic lifting surfaces.

15. The aircraft as in claim 13 wherein the aerodynamic lifting structures further comprise supports for aircraft engines, and the supports are at the outer ends of the lateral extensions included in the aerodynamic lifting structure supporting the aircraft engine.

16. The aircraft as in claim 13 wherein the central frame element for each of the frames has a greater thickness along a portion aligned along a straight line with the lateral extensions for the corresponding frame.

17. The aircraft as in claim 16 wherein a lower edge of the portion having the greater thickness is aligned along the straight line with a lower edge of each of the lateral extensions.

18. The aircraft as in claim 16 wherein the portion having the greater thickness is an upper portion of the central frame element.

19. The aircraft as in claim 13 wherein the lateral extensions have outer ends at which are provided aircraft engine connections.

* * * * *